(12) United States Patent
Topart et al.

(10) Patent No.: US 10,293,761 B2
(45) Date of Patent: May 21, 2019

(54) VEHICLE TRIM ELEMENT

(71) Applicant: Faurecia Interieur Industrie, Nanterre (FR)

(72) Inventors: Geoffroy Topart, Beauvais (FR); Thierry Vourlat, L'Isle Adam (FR); Dany Desrus, Rueil Malmaison (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/606,758

(22) Filed: Jan. 27, 2015

(65) Prior Publication Data

US 2015/0210226 A1 Jul. 30, 2015

(30) Foreign Application Priority Data

Jan. 27, 2014 (FR) ..................................... 14 50649

(51) Int. Cl.
| | |
|---|---|
| *F21V 9/00* | (2018.01) |
| *B60R 13/02* | (2006.01) |
| *B60K 35/00* | (2006.01) |
| *B60K 37/00* | (2006.01) |
| *B60Q 3/14* | (2017.01) |
| *B60Q 3/54* | (2017.01) |

(52) U.S. Cl.
CPC .............. *B60R 13/02* (2013.01); *B60K 35/00* (2013.01); *B60K 37/00* (2013.01); *B60Q 3/14* (2017.02); *B60Q 3/54* (2017.02); *B60K 2350/2043* (2013.01); *B60Q 2500/10* (2013.01)

(58) Field of Classification Search
CPC .............. G02B 6/006; B32B 17/10541; B32B 17/10651; B60Q 3/14; B60Q 3/78

USPC ........................................................ 362/511
See application file for complete search history.

(56) References Cited

U.S. PATENT DOCUMENTS

| | | | | |
|---|---|---|---|---|
| 4,236,480 | A | 12/1980 | Grohl | |
| 5,913,617 | A * | 6/1999 | Helstern | G09F 13/04 |
| | | | | 200/313 |
| 7,901,120 | B2 * | 3/2011 | Droste | B60Q 1/323 |
| | | | | 362/495 |
| 2001/0040393 | A1 * | 11/2001 | Sano | B60Q 1/323 |
| | | | | 296/209 |
| 2002/0089468 | A1 | 7/2002 | Wedel et al. | |
| 2007/0080948 | A1 * | 4/2007 | Wernersson | G06F 3/0238 |
| | | | | 345/169 |

(Continued)

FOREIGN PATENT DOCUMENTS

| | | |
|---|---|---|
| DE | 2613024 A1 | 9/1977 |
| DE | 19705536 A1 | 8/1998 |

(Continued)

OTHER PUBLICATIONS

Search Report for application No. FR 14 50649, dated Sep. 11, 2014, 3 pages.

*Primary Examiner* — Anh T Mai
*Assistant Examiner* — Matthew J. Peerce
(74) *Attorney, Agent, or Firm* — Reising Ethington P.C.

(57) ABSTRACT

A vehicle trim element has a panel that includes at least one colored mask having solid areas and at least one aperture delimiting a pattern, and a colored screen transmitting light and closing each aperture of the mask. The mask and the screen are substantially of the same color so that the pattern is visible when the panel is backlit and substantially invisible in the absence of backlighting.

28 Claims, 2 Drawing Sheets

(56) References Cited

U.S. PATENT DOCUMENTS

| | | | | |
|---|---|---|---|---|
| 2010/0020028 | A1* | 1/2010 | Laurent | H01H 13/704 |
| | | | | 345/173 |
| 2012/0014130 | A1* | 1/2012 | Lim | H01H 13/83 |
| | | | | 362/606 |
| 2012/0039020 | A1 | 2/2012 | Mathers et al. | |
| 2013/0063050 | A1* | 3/2013 | Morikawa | G09G 3/001 |
| | | | | 315/316 |
| 2014/0119038 | A1* | 5/2014 | Mulder | G09F 13/06 |
| | | | | 362/509 |

FOREIGN PATENT DOCUMENTS

| | | |
|---|---|---|
| DE | 102010051307 A1 | 5/2012 |
| FR | 2417085 A1 | 9/1979 |
| FR | 2920717 A1 | 3/2009 |
| FR | 2936588 A1 | 4/2010 |
| FR | 2937932 A1 | 5/2010 |
| FR | 2945992 A1 | 12/2010 |
| GB | 2419742 A | 5/2006 |
| WO | WO2008022872 A1 | 2/2008 |

* cited by examiner

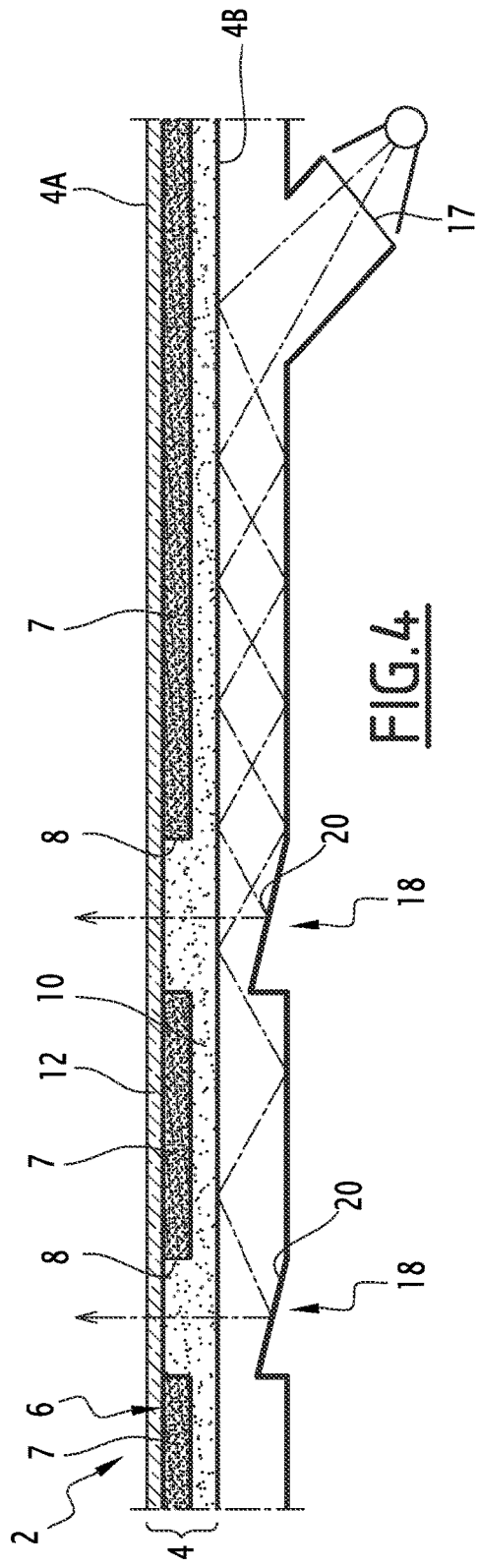
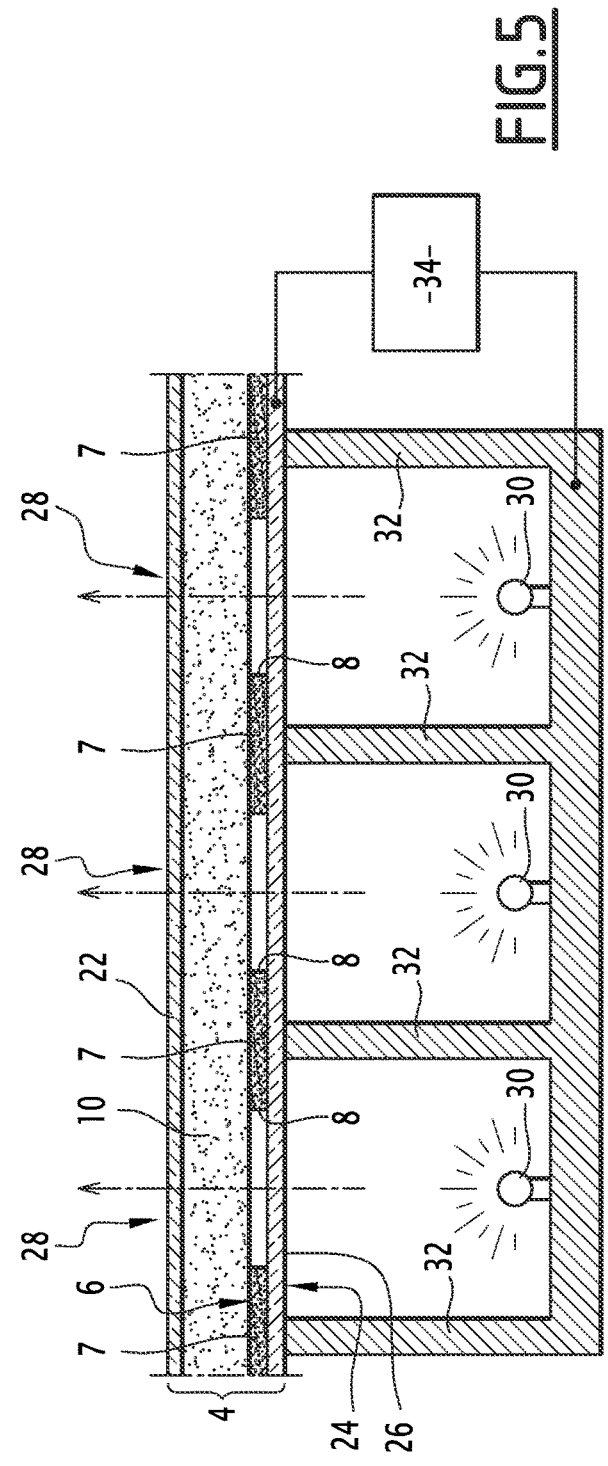

VEHICLE TRIM ELEMENT

FIELD OF THE INVENTION

The present invention relates to field of vehicle trim elements notably for a motor vehicle, and in particular trim elements with back-lighting.

BACKGROUND OF THE INVENTION

FR2920717A1 discloses a trim element with back-lighting comprising a basic body and a coating delimiting an opaque area and a translucent area, the coating comprising a sheet of coating attached to the basic body by over molding.

FR2945992A1 discloses a trim element with back-lighting comprising a transparent fronting covered on each of its faces with a film having a determined pattern and/or a determined color.

SUMMARY OF THE INVENTION

One of the objects of the invention is to propose a vehicle trimmed with back-lighting which has different visual effects depending on the lighting.

For this purpose, the invention proposes a vehicle trim element, the trim element having a panel comprising at least one colored mask having solid areas and at least one aperture delimiting a pattern, and a colored screen transmitting light and closing said or each aperture of the mask, the mask and the screen being substantially of the same color, so that the pattern is visible when the panel is backlit and substantially invisible in the absence of back-lighting.

According to particular embodiments, the trim element comprises one or several of the following features, taken individually or according to all the technically possible combinations:
- the screen is formed with a bulk-colored substrate, the mask being formed with at least one ink layer applied on the screen;
- the mask is formed with a bulk-colored substrate, the screen being formed by at least one ink layer applied on the mask;
- the mask and the screen are formed with at least one ink layer, notably with one to ten ink layers;
- the screen transmits more the light than the solid areas of the mask;
- the mask is made in an opaque material or in a material transmitting light;
- it comprises a support transmitting light, preferably colorless, the panel covering the support;
- the support forms a light guide and comprises a light inlet for injecting light into the support;
- the panel comprises a supporting film transmitting light and colorless, the mask and the screen being formed on the supporting film;
- it comprises a sensitive sensor positioned against the rear face of the panel in order to detect an interaction of a user with one or several interaction areas of the front face of the panel;
- the mask forms a respective elementary pattern in each of the interaction areas;
- it comprises a respective light source for the back-lighting of each interaction area and of the opaque partitions separating the light sources;
- the screen is formed with at least one layer of ink, notably one or ten ink layers; and
- the mask is made in a first material, and the screen is made in a second material transmitting more the light than the first material.

The invention also relates to an automobile vehicle comprising a trim element as defined above.

BRIEF DESCRIPTION OF THE DRAWINGS

The invention and advantages thereof will be better understood upon reading the description which follows, only given as an example, and made with reference to the appended drawings, wherein:

FIG. 4 is a schematic sectional view of a trim assembly according to a fourth embodiment; and FIG. 5 is a schematic sectional view of a trim assembly according to a fifth embodiment.

DETAILED DESCRIPTION OF ILLUSTRATED EMBODIMENTS

Figure 1:
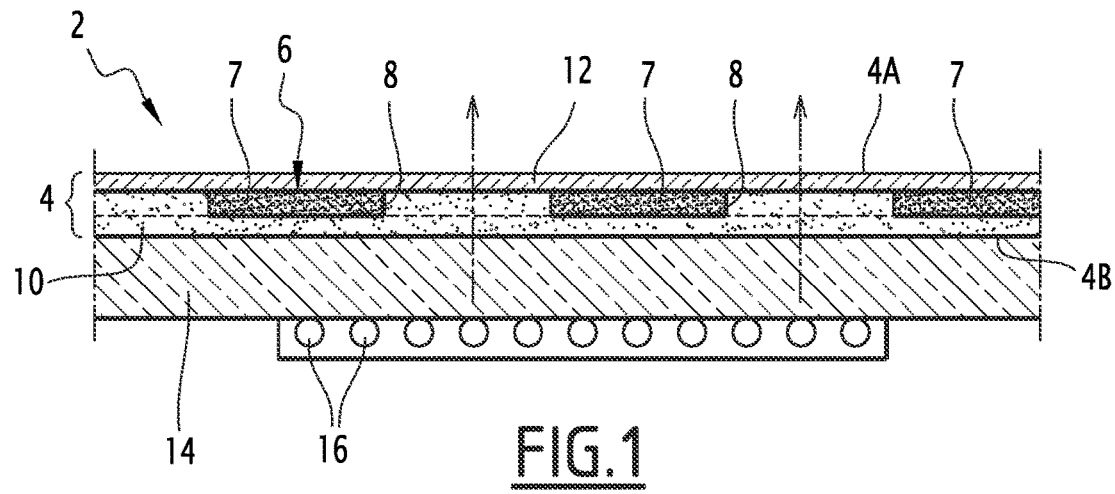
FIG. 1 is a schematic sectional view of a trim element according to a first embodiment.

The vehicle trim element 2 illustrated in FIG. 1 is for example an interior vehicle trim, intended to trim the passenger compartment of a vehicle, in particular an automobile vehicle.

The trim element 2 is for example provided for cladding a dashboard, an interior door trim, a roof liner, a seat back, a console, etc.

The trim element 2 comprises a decorative panel 4 able to produce various light effects depending on the lighting.

The panel 4 comprises a front face 4A intended to be visible and a rear face 4B opposite to the front face 4A. The panel 4 is a multilayered panel and comprises several layers superposed between its front face 4A and its rear face 4B.

The panel 4 comprises a layer formed by a colored mask 6 made in a first material.

The mask 6 has solid areas 7 and at least one aperture 8, here several apertures 8. The solid areas 7 extend between the apertures 8. The apertures 8 allow light to pass through the mask 6. The apertures 8 delimit a pattern, visible on the visible face 4A when the panel 4 is backlit. The mask 6 forms a discontinuous layer of the panel 4.

The panel 4 comprises a layer formed with at least one colored screen 10, here a single screen 10, made in a second material transmitting visible light. The screen 10 closes the apertures 8 of the mask 6. The screen 10 is located on the path of the light passing through the apertures 8 of the rear face 4B towards the front face 4A. The screen 10 forms a continuous layer of the panel 4.

The mask 6 and the screen 10 form two superposed layers of the panel 4, the screen 10 closing the apertures 8 of the mask 6.

The screen 10 transmits more visible light than the solid areas 7 of the mask 6.

The first material of the mask 6 is preferably opaque, so that the light passes through the mask 6 only through its apertures 8.

Alternatively, the first material of the mask 6 transmits the light, but more light passes through the apertures 8 than through the solid areas 7. The first material of the mask 6 is transparent or translucent.

Preferably, the second material transmits more visible light than the first material. The second material has light transmittance in the visible domain, which is greater than that of the first material on the majority of the visible domain. The first material is opaque or transmits light. The second material transmits light. The second material is transparent or translucent.

The mask 6 and the screen 10 are for example formed with ink. Each of the mask 6 and of the screen 10 is formed with an ink layer or with several superposed ink layers. The mask 6 is for example formed with one to ten layers of a first opaque ink. The screen 10 is for example formed with one to ten layers of a second translucent ink.

The average total light transmission rate of the screen 10 formed with one to ten layers of translucent ink is for example comprised between 3% and 15% and preferentially comprised between 5% and 10%.

Because of the superposition of the screen 10 and of the mask 6, the result of this is that the light backlighting the panel 4 passes more easily through the panel 4 facing the apertures 8 of the mask 6 than facing the solid areas 7 of the mask 6. Thus, the pattern is visible on the side of the front face 4A when the panel 4 is backlit.

The first material and the second material are substantially of the same color, and preferably substantially of the same hue. In the absence of backlighting, the mask 6 and the screen 10 appear on the side of the visible face 4A of the same color and with the same luminosity. The panel 4 has a single-color and uniform visual aspect. Thus, the pattern is substantially invisible or not perceivable by a user.

The aforementioned transmission rate ranges provide a good compromise between the lack of uniformity in the absence of backlighting and the power of the light source required for making the pattern visible when the panel is backlit.

The panel 4 comprises a layer formed by a supporting film 12 which transmits the light. The supporting film 12 is transparent or translucent. The supporting film 12 is preferably colorless. The supporting film 12 forms a continuous layer of the panel 4.

The trim element 2 comprises a support 14 defining the shape of the trim element 2.

The panel 4 is attached on the support 14, the front face 4A of the panel being turned opposite to the support 14. The support 14 transmits light. The support 14 is translucent or transparent. The support 14 is preferably colorless.

The trim element 2 comprises a light source 16 for back-lighting the rear face 4B of the panel 4 through the support 14.

The light source is provided here in the form of a flat bundle of optical fibers 16 positioned along the support 14 on the opposite side to the panel 4. In a known way, the optical fibers 16 are provided for scattering light sideways towards the rear face 4B of the panel 4. The optical fibers 16 are connected at at least one end to a light source for injecting light into the optical fibers 16. Alternatively, it is possible to use other light sources, like one or several incandescent bulbs, neon bulbs or one or several light emitting diodes.

When the light backlights the panel 4, the light crosses more easily in the areas of the panel 4 corresponding to the apertures 8 of the mask 6 and the pattern defined by these apertures 8 is visible for a user looking at the front face 4A.

In the absence of backlighting, the mask 6 and the screen 10 of the same color give the panel 4 a uniform and single-color aspect, the pattern being substantially invisible.

This gives the possibility of causing an optical effect improving the perceived quality of the trim.

In the embodiment of FIG. 1, the panel 4 is for example formed by depositing one or several films of a first ink on the supporting film 12 in order to form the mask 6, and then depositing one or several films of a second ink covering the mask 6 in order to form the screen 10. During deposition of the screen 10, the second ink fills the apertures 8.

The panel 4 is then attached onto the support 14 by overmolding the support 14 on the panel 4. To do this, the panel 4 is inserted into a mold, and then some material is molded by compression or injection in the mold in order to form the support 14.

Figure 2:
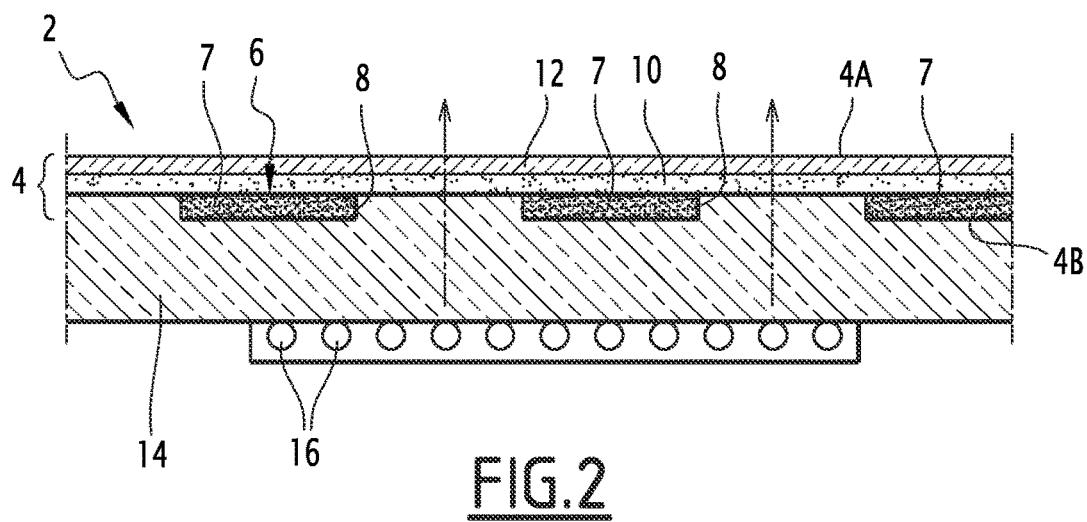
FIG. 2 is a schematic sectional view of a trim element according to a second embodiment.
Figure 3:
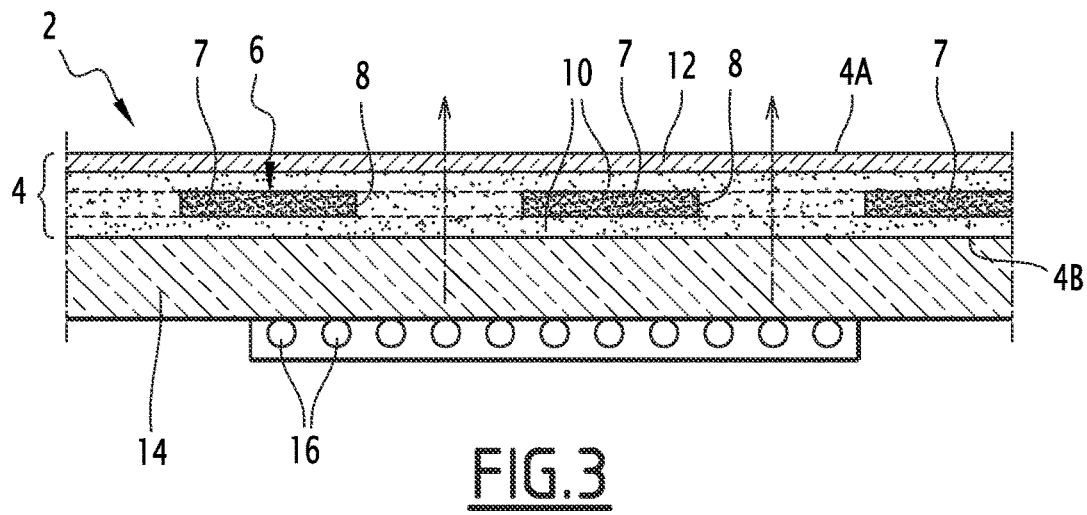
FIG. 3 is a schematic sectional view of a trim assembly according to a third embodiment.

The embodiments of FIGS. 1 to 3 differ from one another by the layout of the mask 6 and of the screen 10.

In the embodiment of FIG. 1, the mask 6 is deposited on the supporting film 12, and then the screen 10 is deposited on the mask 6. The result of this is that the mask 6 is adjacent to the front face 4A and that the screen 10 is adjacent to the rear face 4B.

During deposition of the screen 10, the second ink fills the apertures 8. This is favorable for the uniform aspect of the panel 4 on the side of the visible face 4A when the backlighting is switched off.

In the embodiment of FIG. 2, the screen 10 is formed on the supporting film 12, and the mask 6 is then deposited on the screen 10 on the side opposite to the supporting film 12. The result of this is that the mask 6 is located adjacent to the rear face 4B and that the screen 10 is adjacent to the front face 4A.

As illustrated in FIG. 2, the material of the support 14 fills the apertures 8 of the mask 6, for example because of the overmolding of the support 14 on the panel 4. The material of the support 14 comes into contact with the screen 10 through the apertures 8 of the mask 6.

In the embodiment of FIG. 3, the panel 4 comprises two screens 10 sandwiching the mask 6. The panel 4 is obtained by successively depositing on the supporting film 12, as a superposition, a first screen 10, the mask 6 and then a second screen 10. During deposition of the second screen 10, the second material fills the apertures 8 of the mask 6.

In the embodiments of FIGS. 2 and 3, the screen 10 forms a uniform continuous layer on the side of the front face 4A, which is favorable to the uniform aspect of the panel 4 from the side of the front face 4A when backlighting is switched off.

The embodiment of FIG. 4 differs from those of FIGS. 1 to 3 by achieving backlighting.

In the embodiments of FIGS. 1 to 3, a light source illuminates one face of the support 14 opposite to the panel 4.

In the embodiment of FIG. 4, the support 14 forms a light guide. It comprises a light inlet 17 for injecting light into the support 14 so that the light propagates in the support 14 along the rear face 4B of the panel 4.

The support 14 comprises internal raised/recessed portions 18 allowing deviation of the light propagating in the support 14 for having it exit towards the apertures 8 of the mask 6 of the panel 4. Internal raised/recessed portions 18 are for example provided in the form of facets 20 oriented in such a way that rays from the light inlet 17 and incident on a facet, are deviated towards an aperture 8.

In the embodiment of FIG. 4, the mask 6 and the screen 10 are similar to those of the trim element of FIG. 1. Alternatively, they are made like those of the trim elements of FIG. 2 or of FIG. 3.

In the embodiments of FIGS. 1 to 4, the mask 6 and the screen 10 are formed with inks In the embodiment of FIG. 5, the panel 4 comprises a screen 10 formed by a substrate, colored in the bulk, and giving its shape to the panel 6. The mask 6 is formed by an ink layer deposited on the screen 10 on the side of the rear face 4B of the panel 4. The panel 4 further comprises a protective film 22 covering the screen 10 on the side of the visible face of the panel 4.

Moreover, the trim element comprises a capacitive sensor 24 applied against the rear face 4B of the panel 4. In a known way, the capacitive sensor 24 is formed with a sheet 26 covered with electrodes allowing the capacitive sensor 24 to detect through the panel 4, interaction with the predefined interaction areas 28 of panel 4, each interaction locally modifying the electromagnetic field. The sheet 26 transmits the light. The sheet 26 is transparent or translucent. The electrodes are formed with an ink deposited on the sheet 26.

The mask 6 defines in each interaction area 28 a respective elementary pattern. The capacitive sensor 24 is for example able to detect the contact of a finger with the front face 4A of the panel 4, on an interaction area 28.

The trim element 2 comprises an individual light source 30 for each interaction area 28. Each light source 30 is positioned so as to backlight the associated interaction area 28. The trim element 2 comprises opaque partitions 32 positioned between the light sources 30, so that each light source 30 only backlights the associated interaction area 28. The light sources are for example light-emitting diodes.

The trim element 2 comprises an electronic unit 34 connected to the capacitive sensor 24 for determining an interaction with each interaction area 28. The electronic unit 34 is also connected to the light sources 30.

In the embodiment of FIG. 5, in the absence of backlighting, each interaction area 28 has a uniform aspect, the interaction pattern being invisible because of the similar colors of the mask 6 and of the screen 10. In the presence of back-lighting, the interaction pattern appears as a light pattern.

The trim element 2 for example forms a control assembly for controlling the functional members of the vehicle to which the electronic unit 34 is connected. The interaction patterns represent control patterns.

The interaction patterns are for example invisible when the vehicle is off, and appear upon switching on the vehicle by ignition of the light sources 30.

In an alternative of the embodiment of the trim element 2 of FIG. 5, the mask 6 is made in a bulk-colored substrate, and the screen 10, formed for example with ink, covers the mask 6.

Using a construction as described above, it is possible to obtain a trim element with backlighting showing a pattern when the backlighting is active, the pattern being invisible or practically invisible to the user when the backlighting is inactive. This gives the possibility of giving the trim element a particular effect which increases the perceived quality.

The mask and the screen are advantageously of black color so that the panel appears to be uniformly black in the absence of backlighting and the light pattern appears in the presence of backlighting. The black color is particularly effective for making the pattern invisible in the absence of backlighting. Further it gives a high perceived quality.

The invention claimed is:

1. A vehicle trim element configured for installation in a vehicle, the trim element having a panel comprising at least one colored mask formed of a first material and having solid areas and at least one aperture delimiting a pattern, and a first colored screen formed of a second material, the colored screen transmitting light and closing said or each aperture of the mask, the first material of the mask and the second material of the screen being substantially of the same color, so that, when the trim element is installed in the vehicle, the pattern is visible at a front face of the panel in a passenger compartment of the vehicle when the panel is backlit at an opposite rear face of the panel and substantially invisible in the absence of backlighting, wherein the panel comprises a second colored screen formed from a material that transmits light and is substantially the same color as the first and second materials, the two colored screens sandwiching the mask therebetween.

2. The trim element according to claim 1, wherein the first screen is formed with a bulk-colored substrate, the mask being formed with at least one ink layer applied onto the first screen.

3. The trim element according to claim 1, wherein the mask is formed with a bulk-colored substrate, the second screen being formed with at least one ink layer applied on the mask.

4. The trim element according to claim 1, wherein the mask and the first or second screen are formed with at least one ink layer.

5. The trim element according to claim 1, wherein the mask and the first or second screen are formed with one to ten ink layers.

6. The trim element according to claim 1, wherein each screen transmits more light than the solid areas of the mask.

7. The trim element according to claim 1, wherein the mask is made in an opaque material or in a material transmitting light.

8. The trim element according to claim 1, comprising a support that transmits light, the panel covering the support.

9. The trim element according to claim 8, wherein the support is colorless.

10. The trim element according to claim 8, wherein the support forms a light guide and comprises a light inlet for injecting light into the support.

11. The trim element according to claim 1, wherein the panel comprises a colorless supporting film transmitting light, the mask and the first screen being formed on the supporting film.

12. The trim element according to claim 1, comprising a sensor positioned against the rear face of the panel for detecting an interaction from a user with one or several interaction areas of the front face of the panel.

13. The trim element according to claim 12, wherein the mask forms a respective elementary pattern in each of the interaction areas.

14. The trim element according to claim 12, comprising a respective light source for backlighting each interaction area and opaque partitions separating the light sources.

15. The trim element according to claim 1, wherein the second material is transparent or translucent.

16. The trim element according to claim 1, wherein the first screen has an average total light transmission rate of between 3% and 15%.

17. The trim element according to claim 1, wherein the first material transmits visible light such that light passes through the solid areas of the mask, with more light passing through the apertures than through the solid areas.

18. The trim element according to claim 1, wherein the material of one of the colored screens fills the at least one aperture of the colored mask.

19. The trim element according to claim 1, wherein the trim element is a multilayer trim element made a superposition of layers, the first colored screen and the colored mask being superposed layers of the multilayer trim element.

20. The trim element according to claim 1, wherein the second colored screen is formed from the second material.

21. A vehicle trim element, the trim element having a panel comprising:
a colored mask having solid areas and at least one aperture delimiting a pattern, the mask being formed from a first material;
a first colored screen closing said at least one aperture of the mask, the screen being formed from a second material that transmits light; and
a supporting layer that transmits light, the supporting layer forming at least a portion of a visible front face of the panel,
wherein the mask is located between the colored screen and the supporting layer, and
wherein the first material and the second material are substantially the same color so that the pattern is visible at the front face of the panel when the panel is backlit at an opposite rear face of the panel and substantially invisible in the absence of backlighting,
wherein the trim element is a multilayer trim element made a superposition of layers, the first colored screen and the colored mask being superposed layers of the multilayer trim element
wherein the panel comprises a second colored screen formed from a material that transmits light and is substantially the same color as the first and second materials, the two colored screens sandwiching the mask therebetween.

22. The trim element according to claim 21, wherein the supporting layer is colorless.

23. The trim element according to claim 21, wherein the material of one of the colored screens fills the at least one aperture of the colored mask.

24. The trim element according to claim 21, wherein the second colored screen is formed from the second material.

25. A vehicle trim element, the trim element having a panel comprising:
a colored mask having solid areas and at least one aperture delimiting a pattern, the mask being formed from a first material; and
a first colored screen closing said at least one aperture of the mask, the screen being formed from a second material that transmits light,
wherein the first material and the second material are substantially the same color so that the pattern is visible when the panel is backlit and substantially invisible in the absence of backlighting, and
wherein the first material transmits light such that light passes through the solid areas of the mask, with more light passing through the apertures than through the solid areas,
wherein the trim element is a multilayer trim element made a superposition of layers, the first colored screen and the colored mask being superposed layers of the multilayer trim element,
wherein the panel comprises a second colored screen formed from a material that transmits light and is substantially the same color as the first and second materials, the two colored screens sandwiching the mask therebetween.

26. The trim element according to claim 25, further comprising a supporting layer that transmits light, the mask and first screen being formed on the supporting layer, wherein the supporting layer is colorless.

27. The trim element according to claim 25, wherein the material of one of the colored screens fills the at least one aperture of the colored mask.

28. The trim element according to claim 25, wherein the second colored screen is formed from the second material.

* * * * *